United States Patent
Kobayashi et al.

(10) Patent No.: US 10,764,487 B2
(45) Date of Patent: Sep. 1, 2020

(54) DISTANCE IMAGE ACQUISITION APPARATUS AND APPLICATION THEREOF

(71) Applicant: FUJIFILM Corporation, Tokyo (JP)

(72) Inventors: Makoto Kobayashi, Saitama (JP); Tomoyuki Kawai, Saitama (JP); Yoshinori Furuta, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 259 days.

(21) Appl. No.: 16/054,094

(22) Filed: Aug. 3, 2018

(65) Prior Publication Data

US 2018/0343381 A1 Nov. 29, 2018

Related U.S. Application Data

(63) Continuation of application No. PCT/JP2017/000814, filed on Jan. 12, 2017.

(30) Foreign Application Priority Data

Feb. 9, 2016 (JP) .................. 2016-022834

(51) Int. Cl.
  *G01B 11/14* (2006.01)
  *G01S 17/89* (2020.01)
  (Continued)

(52) U.S. Cl.
  CPC ....... *H04N 5/23212* (2013.01); *G01B 11/026* (2013.01); *G01B 11/14* (2013.01);
  (Continued)

(58) Field of Classification Search
  CPC .......... G01B 11/026; G01B 11/14; G01C 3/08
  See application file for complete search history.

(56) References Cited

U.S. PATENT DOCUMENTS

2010/0168957 A1 7/2010 Takahashi
2014/0253688 A1* 9/2014 Metz ............... G01B 11/24
                                                    348/46

FOREIGN PATENT DOCUMENTS

JP 62-108172 A 5/1987
JP 2002-202122 A 7/2002
(Continued)

OTHER PUBLICATIONS

International Preliminary Report on Patentability and Written Opinion of the International Searching Authority(Forms PCT/IPEA/409 and PCT/ISA/237), dated Apr. 11, 2017, for International Application No. PCT/JP2017/000814, with an English Translation.
(Continued)

*Primary Examiner* — Minh Q Phan
(74) *Attorney, Agent, or Firm* — Birch, Stewart, Kolasch & Birch, LLP

(57) ABSTRACT

Provided are a distance image acquisition apparatus capable of obtaining a wide-range and high-accuracy distance image, and an application thereof. The distance image acquisition apparatus includes a distance image generation unit (42) that generates a distance image including a plurality of distance values corresponding to a time of flight of light from an light emitting unit (12) to a light-receiving surface of an imaging unit (20) on the basis of an imaging result of the imaging unit (20); a storage unit (22) that stores correction information corresponding to a lens thickness difference between a plurality of main light beam paths from a lens (14) to the light-receiving surface of the imaging unit (20); and a correction unit (44) that corrects the distance values in the distance image on the basis of the correction information.

17 Claims, 16 Drawing Sheets

(51) Int. Cl.
  *H04N 5/232*  (2006.01)
  *G01S 7/497*  (2006.01)
  *G01S 17/08*  (2006.01)
  *G01S 7/481*  (2006.01)
  *G01B 11/02*  (2006.01)
  *G01B 11/26*  (2006.01)
  *G06K 9/00*  (2006.01)

(52) U.S. Cl.
  CPC ............ *G01B 11/26* (2013.01); *G01S 7/4816* (2013.01); *G01S 7/497* (2013.01); *G01S 17/08* (2013.01); *G01S 17/89* (2013.01); *G06K 9/00604* (2013.01)

(56) References Cited

FOREIGN PATENT DOCUMENTS

| | | |
|---|---|---|
| JP | 2005-260526 A | 9/2005 |
| JP | 2008-249431 A | 10/2008 |
| JP | 2010-151680 A | 7/2010 |
| JP | 2011-15721 A | 1/2011 |
| JP | 2014-62795 A | 4/2014 |
| JP | 2015-178982 A | 10/2015 |

OTHER PUBLICATIONS

International Search Report (Form PCT/ISA/210), dated Apr. 11, 2017, for corresponding International Application No. PCT/JP2017/000814, with an English translation.
Japanese Office Action for corresponding Japanese Application No. 2017-566551, dated Aug. 28, 2019, with English translation.

\* cited by examiner

DISTANCE IMAGE ACQUISITION APPARATUS AND APPLICATION THEREOF

CROSS-REFERENCE TO RELATED APPLICATIONS

The present application is a Continuation of PCT International Application No. PCT/JP2017/000814 filed on Jan. 12, 2017 claiming priority under 35 U.S.C. § 119(a) to Japanese Patent Application No. 2016-022834 filed on Feb. 9, 2016. Each of the above applications is hereby expressly incorporated by reference, in their entirety, into the present application.

BACKGROUND OF THE INVENTION

1. Field of the Invention

The present invention relates to a distance image acquisition apparatus that acquires a distance image including a plurality of distance values corresponding to a time of flight of light, and an application thereof, and particularly, a technique capable of obtaining a wide-range and high-accuracy distance image.

2. Description of the Related Art

A technique in which light emitted from a light emitting unit and reflected in a distance measurement region is guided to a light-receiving surface of an imaging unit using a lens, and a plurality of distance values corresponding to a time of flight (TOF) of the light from the light emitting unit to the light-receiving surface of the imaging unit are acquired on the basis of an imaging result of the imaging unit, to thereby acquire a distance image indicating distances to various objects in the distance measurement region is known.

JP2014-62795A discloses a technique for performing distortion correction or tilt correction with respect to a distance image acquired by the TOF scheme using a fisheye lens or a wide-angle lens.

JP2010-151680A discloses a technique for performing correction of a distance measurement error in a high reflectivity region that is irradiated with direct sunlight and a distance measurement error in a low reflectivity region where there is a puddle, with respect to a distance image acquired by the TOF scheme.

JP1987-108172A (JP-S62-108172A) discloses a technique in which in an adaptor of a range finder, although an optical path length Ic through a central portion of a lens and an optical path length Ip through an outer peripheral portion of the lens are different from each other, since a focal length f of the lens is about several centimeters and an aperture d is not so large, an optical path length difference (Ip−Ic) is ignored. A study shows that it is because the optical path length difference (Ip−Ic) is "approximately equal to $d^2/8f$".

SUMMARY OF THE INVENTION

A technique capable of acquiring a wide-range distance image using a wide-angle lens having a short focal length and acquiring the distance image with high accuracy has been demanded.

JP2014-62795A discloses the distortion correction or the tilt correction with respect to the distance image acquired by the TOF scheme using the fisheye lens or the wide-angle lens, but does not disclose a technique for correcting distance values in the distance image.

JP2010-151680A discloses a correction technique in a case where a distance measurement target has a high reflectivity and in a case where a distance measurement target has a low reflectivity, but does not disclose a technique for removing or reducing a distance measurement error that noticeably appears as an angle of a lens becomes wide.

Since the technique disclosed in JP1987-108172A (JP-S62-108172A) does not relate to an apparatus that acquires a distance image and does not need to use a wide-angle lens or a fisheye lens, it can be said that a distance measurement error that noticeably appears as an angle of a lens becomes wide is not sufficiently studied. First, since a focal length is long, a distance measurement error due to an optical path length difference between main light beam paths passing through a lens is ignored. Second, a relationship between a lens thickness difference between a central portion and an outer peripheral portion of the lens and a distance measurement error as an angle of the lens becomes wide is not mentioned.

The present inventor focused on the fact that since a lens thickness difference becomes large between a central portion and an outer peripheral portion of a lens as an angle of the lens becomes wide, in order to obtain a wide-range and high-accuracy distance image, the lens thickness difference, in addition to an error of distance values due to an optical path length difference from the lens to a light-receiving surface, should be considered.

In consideration of the above-mentioned problems, an object of the invention is to provide a distance image acquisition apparatus capable of obtaining a wide-range and high-accuracy distance image and an application thereof.

In order to achieve the above object, according to a first aspect of the invention, there is provided a distance image acquisition apparatus comprising: a light emitting unit that emits light; an imaging unit that has a light-receiving surface on which a plurality of light-receiving elements are arranged; an optical system that includes a lens that guides the light emitted from the light emitting unit and reflected in a distance measurement region to the light-receiving surface of the imaging unit; a distance image generation unit that generates a distance image including a plurality of distance values corresponding to a time of flight of the light from the light emitting unit to the light-receiving surface of the imaging unit on the basis of an imaging result of the imaging unit; a correction information storage unit that stores correction information corresponding to a lens thickness difference between a plurality of main light beam paths from the lens to the light-receiving surface of the imaging unit; and a correction unit that corrects the distance values in the distance image on the basis of the correction information.

According to this aspect of the invention, since the correction with respect to the distance values in the distance image is performed on the basis of the correction information corresponding to the lens thickness difference between the plurality of main light beam paths from the lens to the light-receiving surface of the imaging unit, even in a case where the focal length of the lens becomes short, it is possible to reliably reduce errors of the distance values in the distance image. That is, it is possible to obtain a wide-range and high-accuracy distance image.

According to a second aspect of the invention, in the above distance image acquisition apparatus, the correction information corresponds to an optical path length difference and the lens thickness difference between the plurality of main light beam paths, and the correction unit performs correction relating to the optical path length difference and the lens thickness difference with respect to the distance image. According to this aspect of the invention, since the correction with respect to the distance values in the distance image is performed on the basis of the correction information corresponding to the optical path length difference in addition to the lens thickness difference between the plurality of main light beam paths from the lens to the light-receiving surface of the imaging unit, it is possible to further reduce the errors of the distance values in the distance image.

According to a third aspect of the invention, in the above distance image acquisition apparatus, the correction information includes first correction information corresponding to the optical path length difference and second correction information corresponding to the lens thickness difference. According to this aspect of the invention, since the correction information is divided into the first correction information corresponding to the optical path length difference and the second correction information corresponding to the lens thickness difference, it is possible to selectively use the first correction information and the second correction information, or to give weights to the first correction information and the second correction information.

According to a fourth aspect of the invention, in the above distance image acquisition apparatus, the lens has a structure in which a lens thickness concentrically increases from a central portion of the lens to a peripheral portion thereof, the distance image is configured to include a plurality of pixels respectively having the plurality of distance values, the correction information storage unit stores the correction information in association with an image height, and the correction unit performs correction with respect to each distance value in the distance image on the basis of coordinates of each pixel of the distance image and the correction information associated with the image height. According to this aspect of the invention, it is possible to store the correction information in a one-dimensional table using the image height as a parameter, and to correct each distance value in the distance image on the basis of the one-dimensional table. That is, it is possible to simply perform the correction process with a small amount of memory.

According to a fifth aspect of the invention, in the above distance image acquisition apparatus, the optical system includes a stop, the distance image acquisition apparatus further comprises an F number acquisition unit that acquires an F number of the stop of the optical system, the correction information storage unit stores the correction information for each F number of the stop; and the correction unit acquires the correction information corresponding to the acquired F number from the correction information storage unit and performs correction with respect to the distance image on the basis of the correction information. According to this aspect of the invention, even in a case where the F number of the optical system is changed, it is possible to obtain a high-accuracy distance image.

According to a sixth aspect of the invention, in the above distance image acquisition apparatus, the optical system includes a zoom lens, the distance image acquisition apparatus further comprises a zoom position acquisition unit that acquires a zoom position of the zoom lens of the optical system, the correction information storage unit stores the correction information for each zoom position of the zoom lens, and the correction unit acquires the correction information corresponding to the acquired zoom position from the correction information storage unit and performs correction with respect to the distance image on the basis of the correction information. According to this aspect of the invention, even in a case where an angle of view of the optical system is changed, it is possible to obtain a high-accuracy distance image.

According to a seventh aspect of the invention, in the above distance image acquisition apparatus, the optical system is an exchange type optical system that is able to be detachably mounted with respect to an apparatus main body including the imaging unit, the distance image acquisition apparatus further comprises an identification information acquisition unit that acquires identification information of the lens or identification information of the optical system, the correction information storage unit stores the correction information for each piece of identification information, and the correction unit acquires the correction information corresponding to the acquired identification information and performs correction with respect to the distance image on the basis of the correction information. According to this aspect of the invention, even in a case where the optical system is an exchange type, it is possible to obtain a high-accuracy distance image in accordance with the type of the lens of the optical system or the type of the optical system.

According to an eighth aspect of the invention, in the above distance image acquisition apparatus, the lens includes a wide-angle lens or a fisheye lens.

According to a ninth aspect of the invention, in the above distance image acquisition apparatus, the lens has an angle of view of 140° or greater.

According to another aspect of the invention, there is provided a distance image correction apparatus comprising: an input unit through which a distance image including a plurality of distance values is input; a correction information storage unit that stores, in a case where the distance image is acquired using a distance image acquisition apparatus that includes a light emitting unit, a lens, and an imaging unit, correction information including a plurality of correction values corresponding to a lens thickness difference between a plurality of main light beam paths from the lens to a light-receiving surface of the imaging unit; and a correction unit that performs correction with respect to the distance values in the distance image on the basis of the correction information.

In the distance image correction apparatus according to this aspect of the invention, it is preferable that the correction information corresponds to an optical path length difference and the lens thickness difference between the plurality of main light beam paths, and the correction unit performs correction relating to the optical path length difference and the lens thickness difference with respect to the distance image.

In the distance image correction apparatus according to this aspect of the invention, it is preferable that the distance image correction apparatus further comprises: an output unit that outputs the corrected distance image to the distance image acquisition apparatus.

In the distance image correction apparatus according to this aspect of the invention, it is preferable that the distance image correction apparatus further comprises: an identification information acquisition unit that acquires at least one of identification information of the lens, identification information of an optical system including the lens, or identification information of the distance image acquisition apparatus, the correction information storage unit stores the correction information in association with the plurality of pieces of identification information, and the correction unit performs correction of the distance image on the basis of the correction information associated with the identification information acquired by the identification information acquisition unit.

According to still another aspect of the invention, there is provided a distance image acquisition method comprising, in a state where correction information including a plurality of correction values corresponding to a lens thickness difference between a plurality of main light beam paths from a lens to a light-receiving surface of an imaging unit is stored in a correction information storage unit: a step of performing imaging using the imaging unit in a state where light emitted from a light emitting unit and reflected in a distance measurement region is guided to the light-receiving surface of the imaging unit by an optical system including the lens; a step of generating a distance image including a plurality of distance values corresponding to a time of flight of the light from the light emitting unit to the light-receiving surface of the imaging unit on the basis of an imaging result of the imaging unit; and a step of correcting the distance values in the distance image on the basis of the correction information.

In the distance image acquisition method according to this aspect of the invention, it is preferable that the correction information corresponds to a lens thickness difference between the plurality of main light beam paths and an optical path length difference between the plurality of main light beam paths, and correction relating to the lens thickness difference and the optical path length difference is performed with respect to the distance values in the distance image.

According to still another aspect of the invention, there is provided a correction information generation method comprising: a step of acquiring, in a case where a distance image including a plurality of distance values is acquired using a distance image acquisition apparatus that includes a light emitting unit, a lens, and an imaging unit, lens characteristic information including information on a lens thickness difference between a plurality of main light beam paths from the lens to a light-receiving surface of the imaging unit and information on a light speed in the lens or information on a material of the lens; and a step of generating correction information with respect to the distance values in the distance image on the basis of the lens characteristic information;

In the correction information generation method according to this aspect of the invention, it is preferable that the lens characteristic information includes information on an optical path length difference between the plurality of main light beam paths.

According to the invention, it is possible to acquire a wide-range and high-accuracy distance image.

DESCRIPTION OF THE PREFERRED EMBODIMENTS

Embodiments of a distance image acquisition apparatus according to the invention will be described with reference to the accompanying drawings.

First Embodiment

Figure 1:
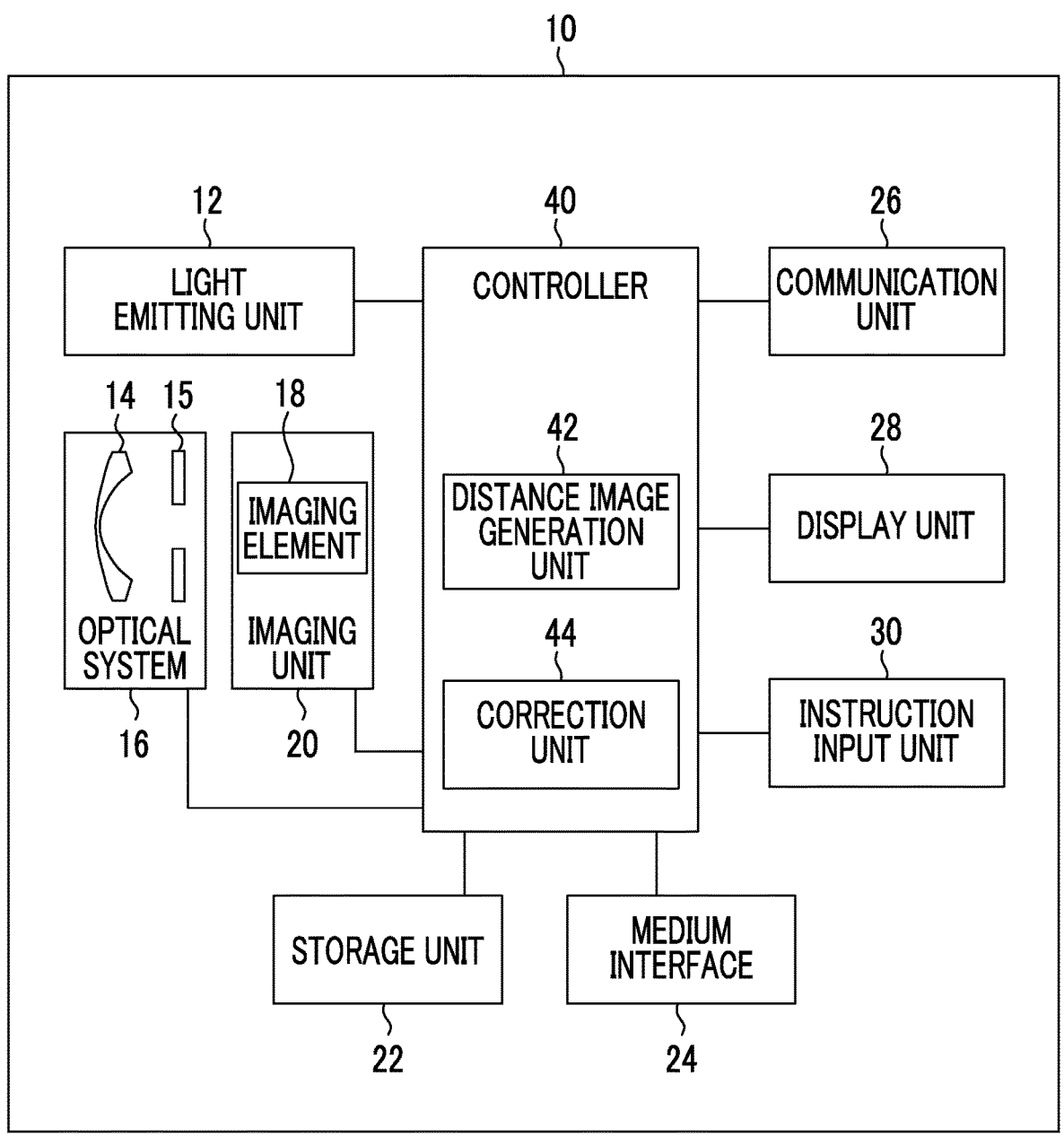
FIG. 1 is a block diagram showing a configuration example of a distance image acquisition apparatus according to a first embodiment.

FIG. 1 is a block diagram showing a configuration example of a distance image acquisition apparatus according to a first embodiment.

A distance image acquisition apparatus 10 includes a light emitting unit 12 that emits light, an optical system 16 that includes a lens 14 and a stop 15, an imaging unit 20 that includes an imaging element 18 having a light-receiving surface on which a plurality of light-receiving elements are arranged, a storage unit 22 that stores a variety of information, a medium interface 24 that performs output and input of information with respect to a recording medium, a communication unit 26 that performs output and input of information with respect to an external device, a display unit 28 that performs a display for a user, an instruction input unit 30 that receives an instruction input from the user, and a controller 40 that controls respective units according to a program.

The light emitting unit 12 is configured of a light emitting diode (LED), for example. A different light emitting device may be used as the light emitting unit.

The optical system 16 includes a wide-angle lens or a fisheye lens as the lens 14. Further, the optical system 16 may be configured to include a plurality of lenses. The lens 14 guides light emitted from the light emitting unit 12 and reflected in a distance measurement region corresponding to an angle of view of the lens 14 to the imaging unit 20.

The wide-angle lens refers to a lens having a large angle of view compared with a standard lens. That is, the wide-angle lens has a focal length shorter than that of a focal length (35 mm) of the standard lens. Particularly, in an ultra wide-angle lens having an angle of view (diagonal angle of view) of 140° or greater, since a peripheral portion of the lens 14 is considerably thick with respect to a central portion of the lens 14 or a material of a high refractive index is used, it is necessary to correct a distance measurement error due to a lens thickness difference between the central portion and the peripheral portion of the lens 14. Here, in a case where the distance measurement error due to the lens thickness difference can be removed or reduced, the focal length and the angle of view of the lens 14 are not particularly limited. In a case where a wide-angle lens of which a focal length is 28 mm or shorter is used, the invention is effective.

The fisheye lens refers to a lens of a projection type (an equidistant projection type, a stereoscopic projection type, or the like) other than a central projection type, and has an angle of view that is generally 180° or greater.

The imaging unit 20 employs a complementary metal oxide semiconductor (CMOS) imaging sensor or a charge coupled device (CCD) imaging sensor as the imaging element 18, for example. Further, the imaging unit 20 may employ a different imaging device. The imaging element 18 has a light-receiving surface on which a plurality of light-receiving elements are arranged.

The storage unit 22 is a form of a "correction information storage unit" in the invention, and stores correction information for correcting a plurality of distance values included in a distance image. The storage unit 22 is configured to include a read only memory (ROM), a random access memory (RAM), and an electrically erasable programmable read only memory (EEPROM). Another storage device may be used.

The communication unit 26 is configured of a wireless communication device, for example. A wired communication device may be used.

The display unit 28 is configured of a liquid crystal display (LCD), for example. Another display device such as an organic electroluminescence display may be used.

The instruction input unit 30 is configured of a touch panel, for example. The instruction input unit 30 may be configured of a keyboard and a pointing device (for example, a mouse). Another input device such as a sound input device or a gesture input device may be used.

The controller 40 is configured of a central processing unit (CPU), for example.

The controller 40 of this example includes a distance image generation unit 42 that generates a distance image including a plurality of distance values corresponding to a time of flight of light from the light emitting unit 12 to the light-receiving surface of the imaging unit 20 on the basis of an imaging result of the imaging unit 20, and a correction unit 44 that corrects the distance values in the distance image on the basis of correction information stored in the storage unit 22.

Next, errors of distance values, and correction information for removing or reducing the error will be described.

Figure 2:
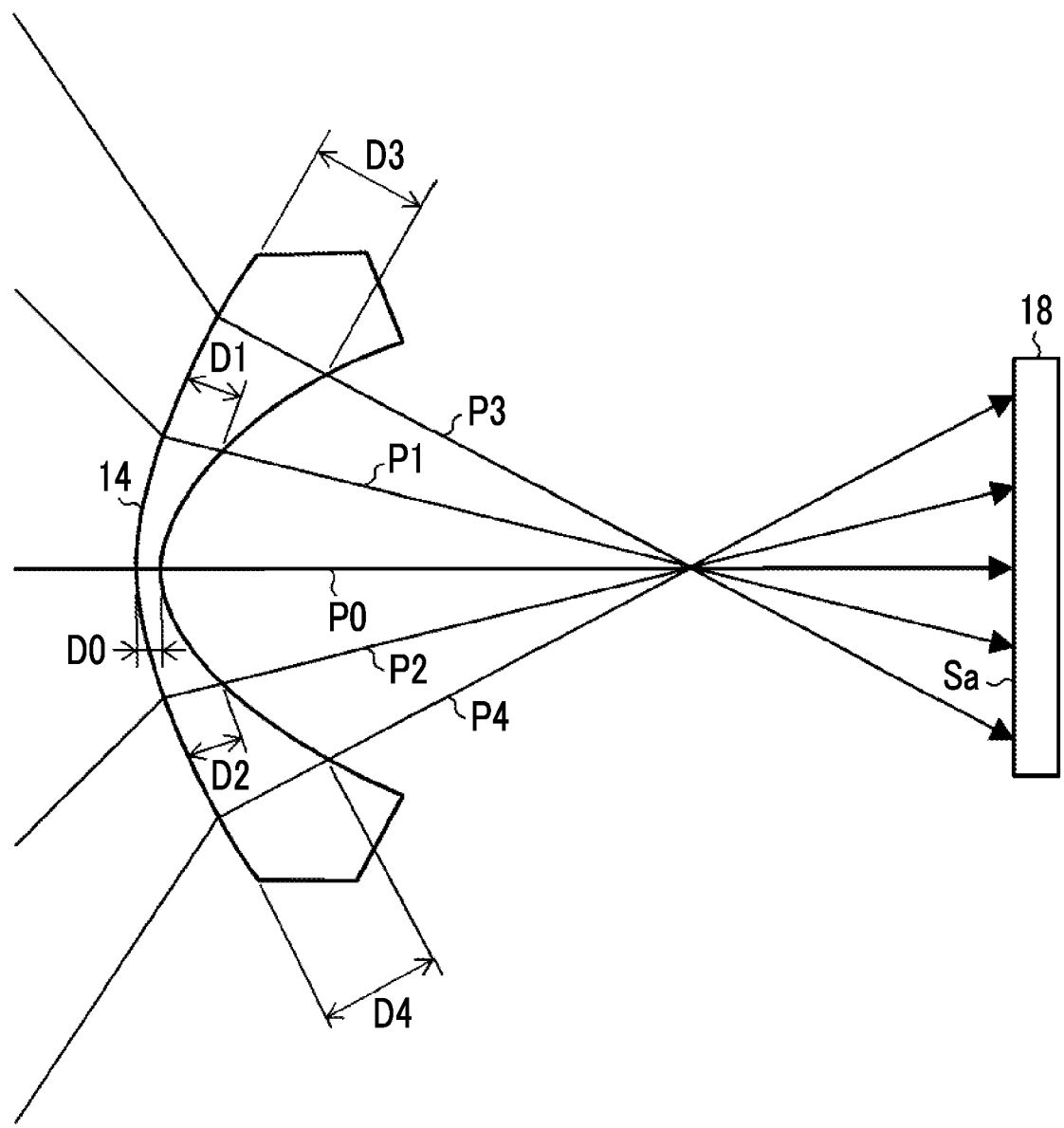
FIG. 2 is an explanatory diagram for illustrating an optical path length difference and a lens thickness difference between main light beam paths of a lens.

FIG. 2 is a diagram for illustrating an optical path length difference and a lens thickness difference between main light beam paths of a lens. FIG. 2 shows one lens 14 for ease of description, but the optical system 16 of this example actually includes a plurality of lenses. Further, FIG. 2 shows five main light beam paths P0, P1, P2, P3, and P4, but actually, more main light beam paths are present. Each main light beam path refers to an optical path from the lens 14 of the optical system 16 to the light-receiving surface of the imaging element 18 of the imaging unit 20, which is an optical path of a light beam (main light beam) passing through the center of an opening of the stop 15. That is, it can be said that the main light beam path is an optical path (representative optical path) that represents a pencil of light.

The error of the distance value (distance measurement error) includes an error due to an optical path length difference between the plurality of main light beam paths (P0 to P4) from the lens 14 to a light-receiving surface Sa of the imaging element 18 (hereinafter, referred to as a "first distance value error") and an error due to differences among lens thicknesses (D0 to D4) on the plurality of main light beam paths (P0 to P4) in the lens 14 (hereinafter, referred to as a "second distance value error").

The first distance value error is determined according to an aperture of the lens 14, in addition to a focal length of the lens 14. As the aperture of the lens 14 becomes smaller, the first distance value error becomes smaller.

The second distance value error is determined according to a difference between a light speed in the lens 14 and a light speed outside the lens 14 (light speed in the air), in addition to the lens thickness differences (D1−D0, D2−D0, D3−D0, and D4−D0) between a central portion of the lens 14 and a peripheral portion thereof. As a refractive index of the lens 14 becomes larger, the second distance value error becomes larger.

Particularly, in a case where an ultra wide-angle lens of which an angle of view is 140° or greater is used, in order to generate a high-accuracy distance image, the second distance value error due to the lens thickness difference should not be overlooked, as well as the first distance value error due to the optical path length difference.

The storage unit 22 of this example stores correction information corresponding to the optical path length difference between the plurality of main light beam paths and the lens thickness difference between the plurality of main light beam paths. The correction unit 44 of this example performs correction for removing or reducing the first distance value error due to the optical path length difference and the second distance value error due to the lens thickness difference with respect to the distance image using correction information stored in the storage unit 22.

Next, correction information for performing easy and accurate correction based on a lens structure will be described.

Figure 3:
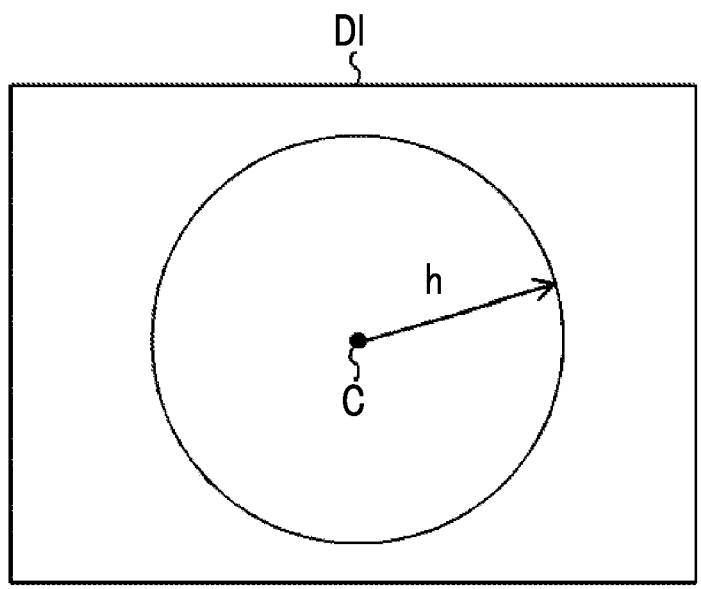
FIG. 3 is a diagram for illustrating an imaging center and an image height in a distance image.

FIG. 3 is a diagram for illustrating an imaging center C and an image height h in a distance image DI.

The lens 14 of this example has a structure in which a lens thickness concentrically increases from the central portion of the lens 14 to the peripheral portion thereof. That is, the lens 14 of this example has a configuration in which the same lens thickness is maintained on a circle having the same distance from the center of the lens 14 and becomes larger as the distance from the center of the lens 14 becomes larger. Accordingly, in the distance image DI shown in FIG. 3, distance value errors (distance value errors with respect to the imaging center C) due to the lens thickness differences and the optical path length differences are the same on a circle having the same image height h, and the distance value errors become larger as the image height h becomes larger. The imaging center C represents a position corresponding to the center of the lens 14.

Figure 4:
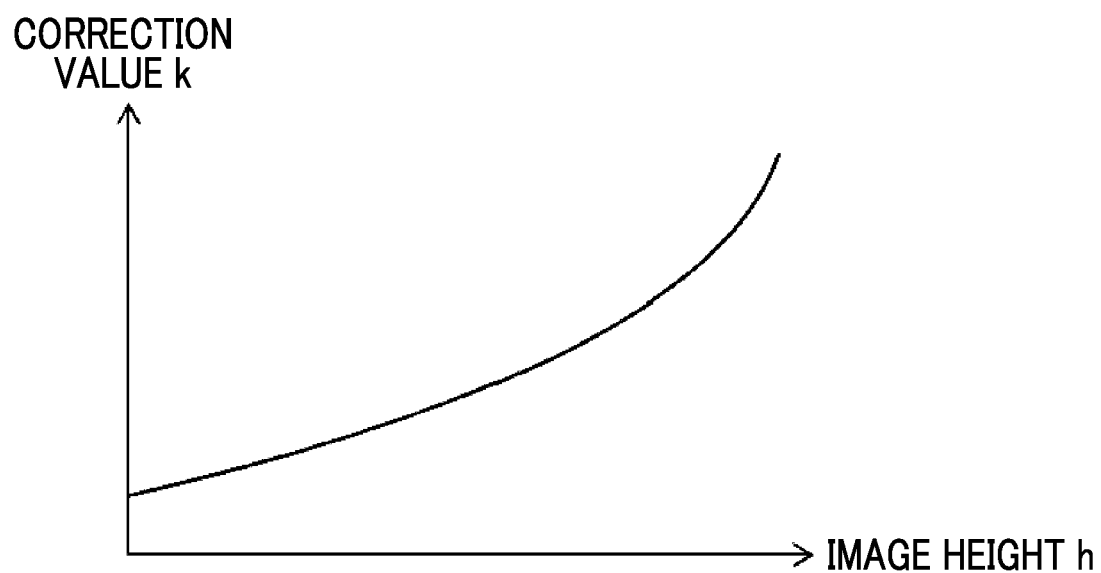
FIG. 4 is a graph showing a relationship between an image height and a correction value in a distance image.

Thus, as shown in FIG. 4, as the image height h becomes larger, a correction value k is set to become larger. That is, the storage unit 22 stores correction information as a one-dimensional table in which the image height h and the correction value k are associated with each other, using the image height h as a parameter. In this example, the correction value k is a difference between a distance value after correction and a distance value before correction (measured distance value).

The correction unit 44 performs correction with respect to each distance value (corresponding to a pixel value of a distance image) of the distance image DI, on the basis of coordinates of each pixel of the distance image DI and correction information (correction value k) associated with the image height h. Here, the coordinates of each pixel of the distance image DI may be represented using a distance (image height h) from the imaging center C. The following expression shows an operation of this example in the correction unit 44.

Distance value after correction of image height
$h$=distance value before correction of image height $h$−correction value $k$ of image height $h$ <Expression 1>

Next, a distance image processing example to which a distance image acquisition method according to the invention is applied will be described.

Figure 5:
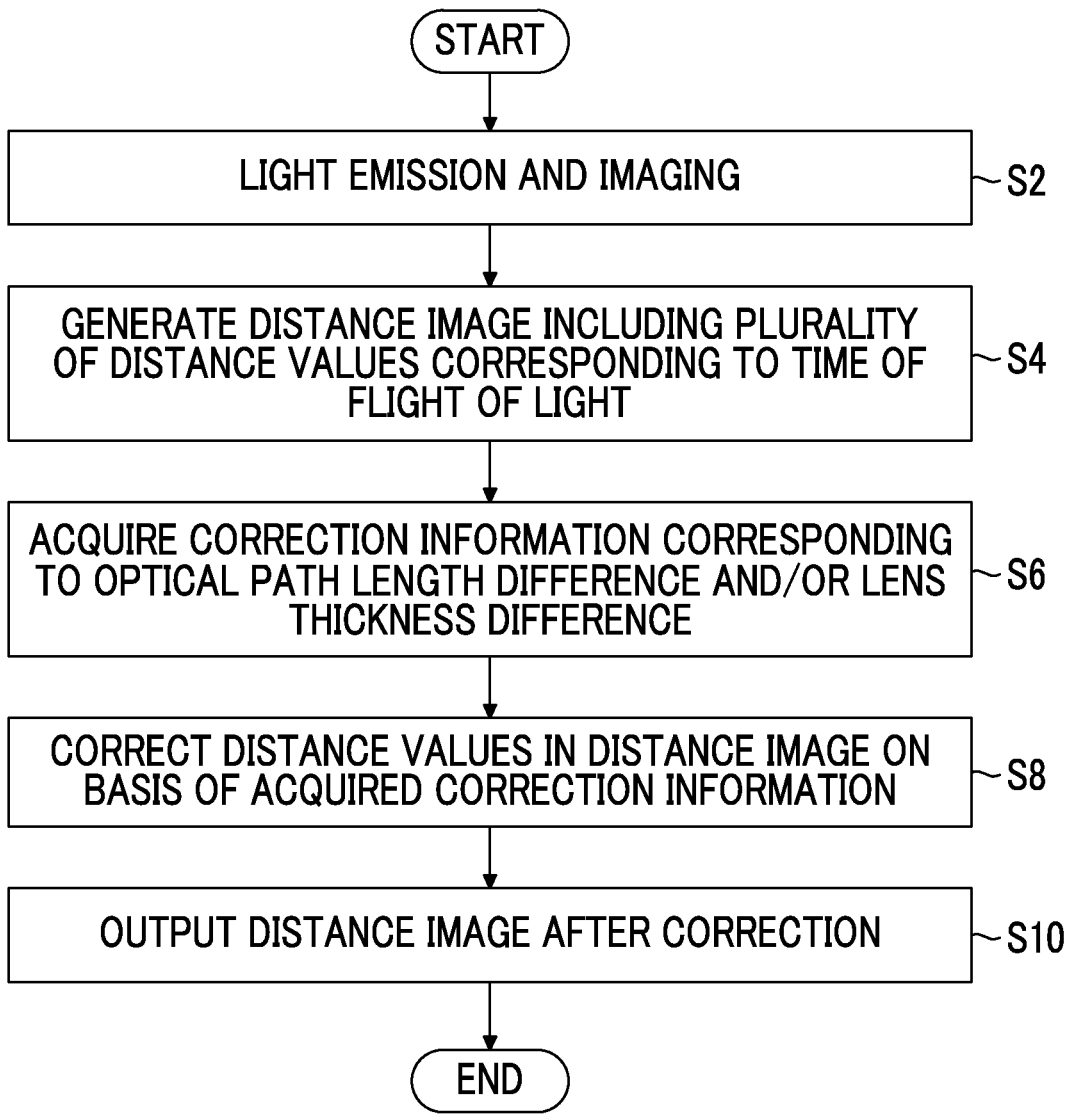
FIG. 5 is a flowchart showing a flow of a distance image processing example in the first embodiment.

FIG. 5 is a flowchart showing a flow of a distance image processing example in the first embodiment. The distance image processing of this example is executed in accordance with a program stored in the storage unit 22 by the controller 40.

First, the light emitting unit 12 emits light toward a distance measurement region, and imaging in the distance measurement region is performed by the imaging unit 20 (step S2). That is, in a state where the light emitted from the light emitting unit 12 and reflected in the distance measurement region is guided to the light-receiving surface of the imaging unit 20 by the optical system 16 including the lens 14, imaging is performed by the imaging unit 20.

Then, the distance image generation unit 42 generates a distance image including a plurality of distance values corresponding to a time of flight of the light from the light emitting unit 12 to the light-receiving surface of the imaging unit 20 on the basis of an imaging result of the imaging unit 20 (step S4).

Then, the correction unit 44 acquires correction information corresponding to an optical path length difference and/or lens thickness difference between main light beam paths from the storage unit 22 (step S6).

The correction unit 44 corrects distance values in the distance image on the basis of the acquired correction information (step S8). In this example, the distance values in the distance image are corrected using the correction value k associated with the image height h shown in FIG. 4.

Then, the corrected distance image is output to a recording medium through the medium interface 24 (step S10). The corrected distance image may be output (transmitted) to an external device through the communication unit 26.

Second Embodiment

Figure 6:
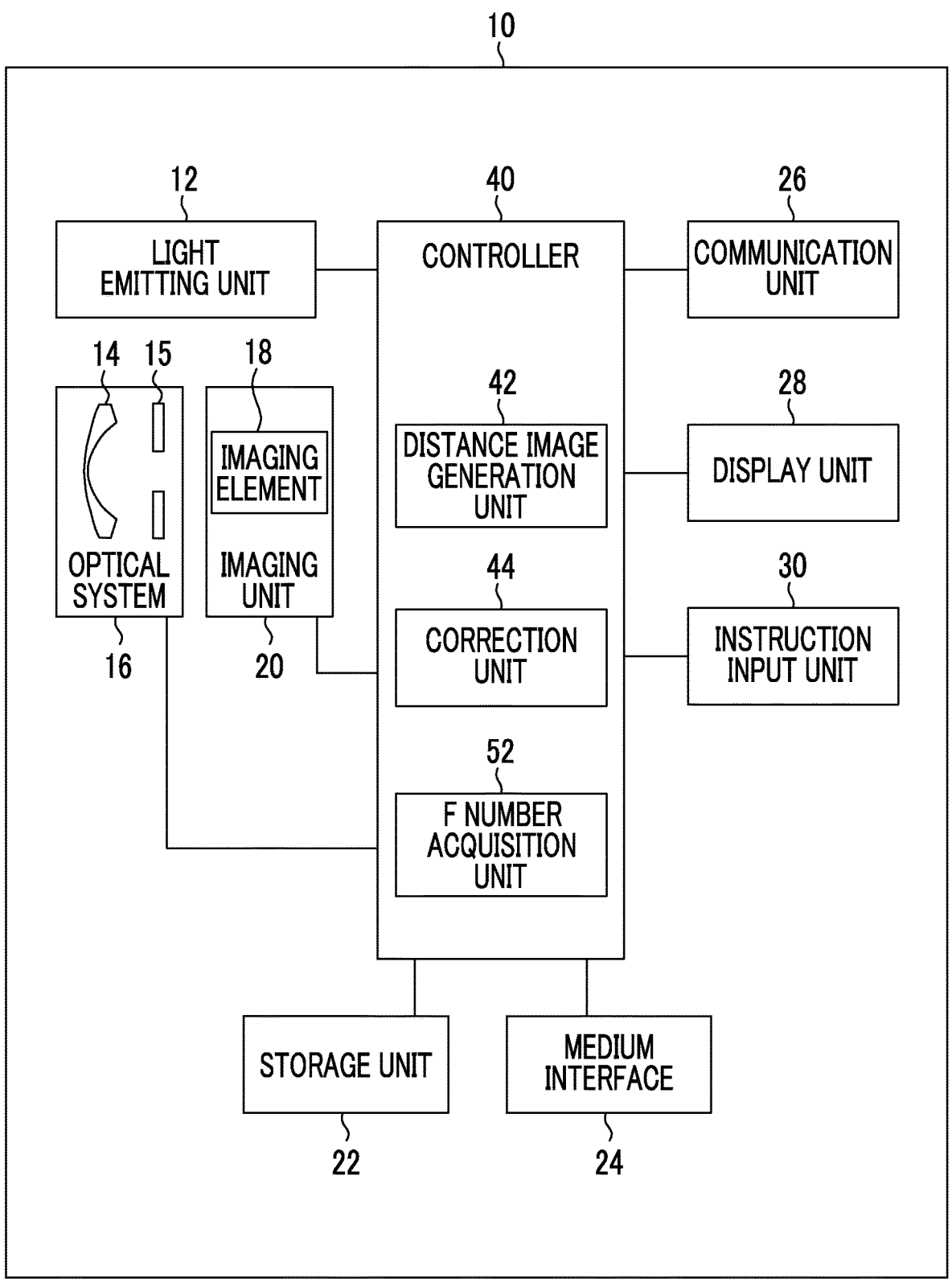
FIG. 6 is a block diagram showing a configuration example of a distance image acquisition apparatus according to a second embodiment.

FIG. 6 is a block diagram showing a configuration example of a distance image acquisition apparatus according to a second embodiment. The same reference numerals are given to the same components as in the first embodiment shown in FIG. 1, and detailed description thereof will not be repeated.

A distance image acquisition apparatus 10 according to this embodiment includes an F number acquisition unit 52 that acquires an F number (hereinafter, referred to as an "F-number") of a stop 15 of an optical system 16.

A storage unit 22 stores correction information for each F number of the stop 15 of the optical system 16.

Figure 7:
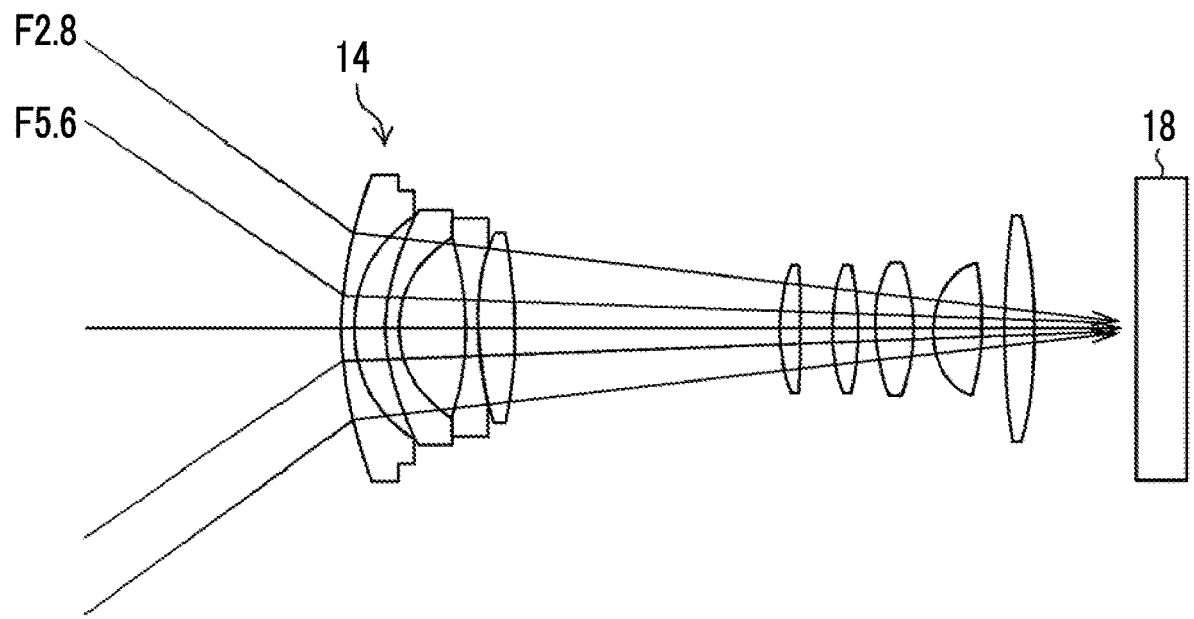
FIG. 7 is an explanatory diagram used for illustration of a relationship between an F number and a main light beam path.
Figure 8:
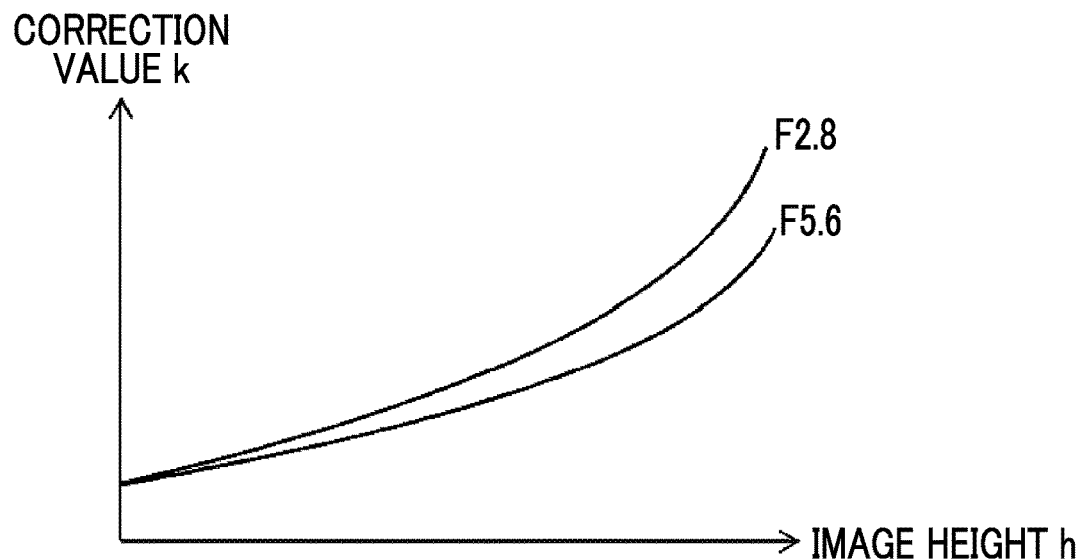
FIG. 8 is a graph showing a relationship between an F number, an image height, and a correction value.

FIG. 7 shows a main light beam path of a lens 14 in an outermost peripheral portion in a case where an F number is "F2.8" and a main light beam path of the lens 14 in an outermost peripheral portion in a case where an F number is "F5.6". FIG. 8 is a graph showing a relationship between an image height h and a correction value k in a case where the F number is "F2.8", and a relationship between an image height h and a correction value k in a case where the F number is "F5.6". Correction information indicating the relationships between the F numbers (F-numbers), the image heights h, and the correction values k is stored in the storage unit 22.

A correction unit 44 acquires correction information corresponding to an F number acquired by the F number acquisition unit 52 from the storage unit 22, and performs correction with respect to a distance image on the basis of the correction information.

Figure 9:
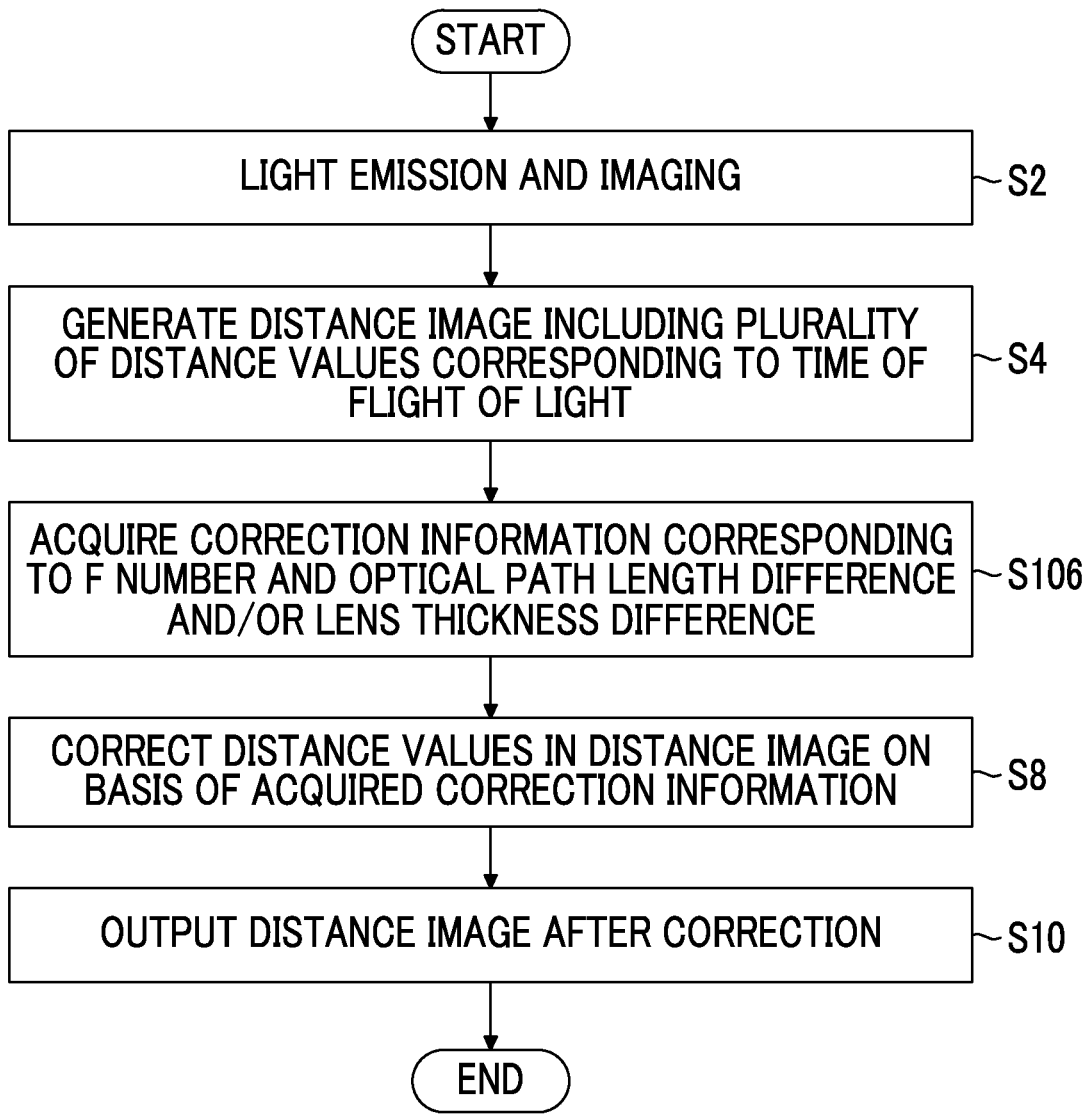
FIG. 9 is a flowchart showing a flow of a distance image processing example in the second embodiment.

FIG. 9 is a flowchart showing a flow of a distance image processing example in the second embodiment. The distance image processing of this example is executed in accordance with a program stored in the storage unit 22 by a controller 40. The same reference numerals are given to the same steps as in the distance image processing example of the first embodiment shown in FIG. 5, and detailed description thereof will not be repeated.

In this example, in step S106, the correction unit 44 acquires correction information corresponding to an F number.

Third Embodiment

Figure 10:
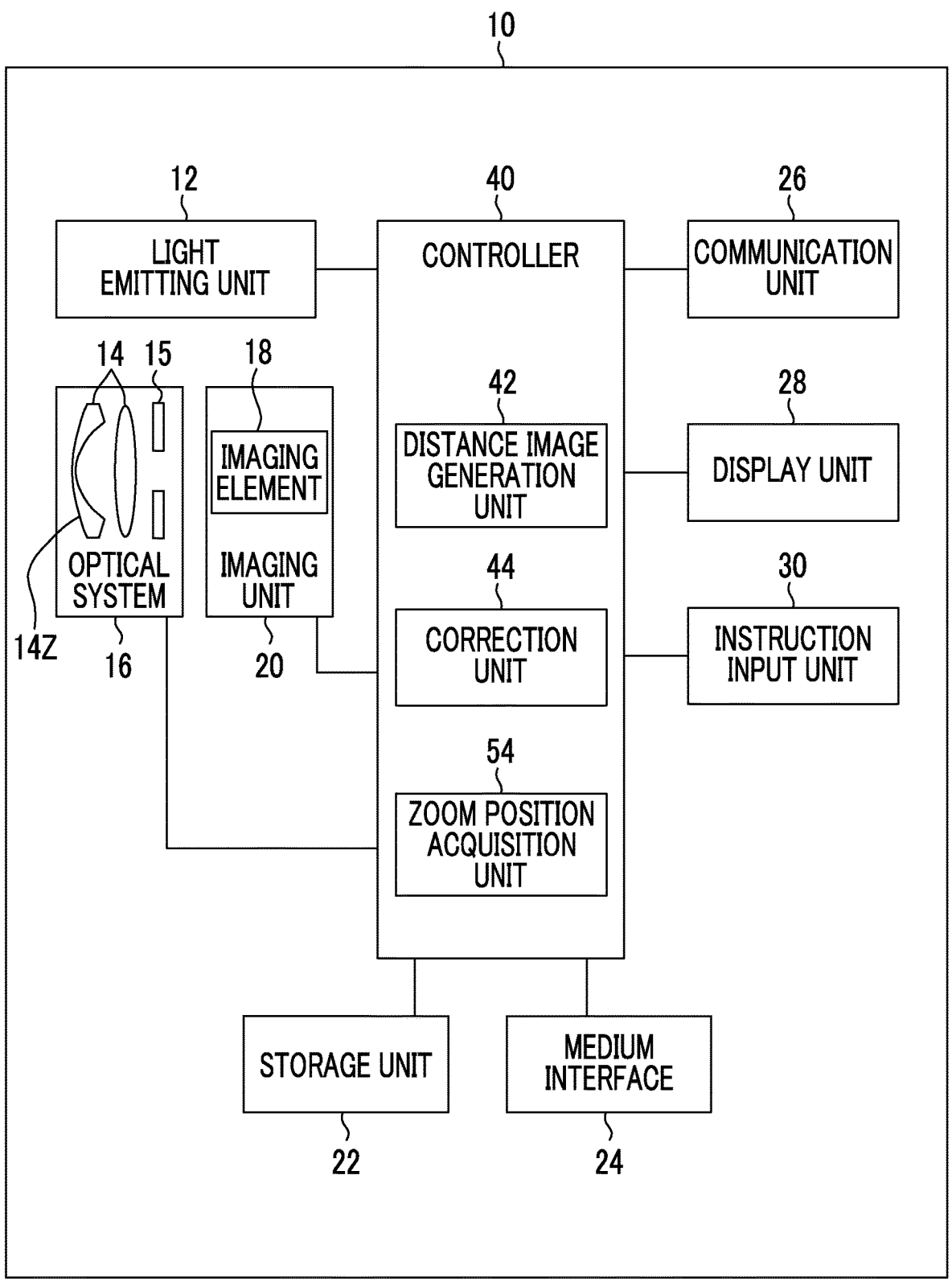
FIG. 10 is a block diagram showing a configuration example of a distance image acquisition apparatus according to a third embodiment.

FIG. 10 is a block diagram showing a configuration example of a distance image acquisition apparatus according to a third embodiment. The same reference numerals are given to the same components as in the first embodiment shown in FIG. 1, and detailed description thereof will not be repeated.

A distance image acquisition apparatus 10 according to this embodiment is configured so that an optical system 16 includes a zoom lens 14Z. Further, the distance image acquisition apparatus 10 of this embodiment includes a zoom position acquisition unit 54 that acquires a zoom position of the zoom lens 14Z of the optical system 16.

A storage unit 22 stores correction information for each zoom position of the zoom lens 14Z of the optical system 16.

Figure 11:
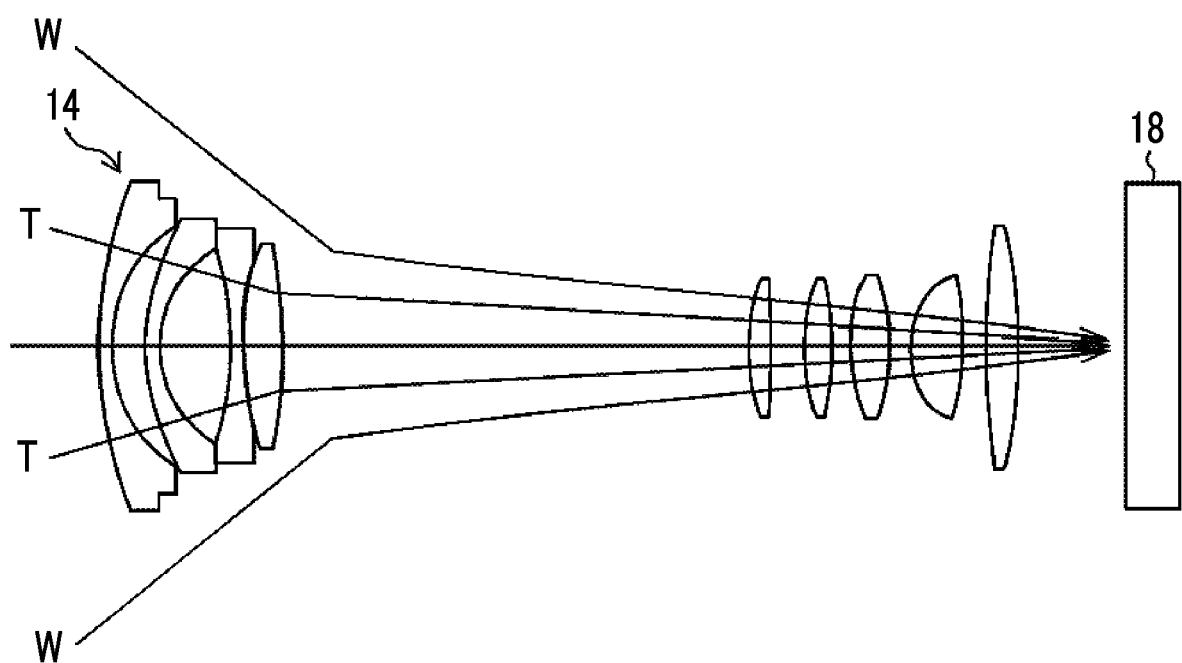
FIG. 11 is an explanatory diagram used for illustration of a relationship between a zoom position and a main light beam path.
Figure 12:
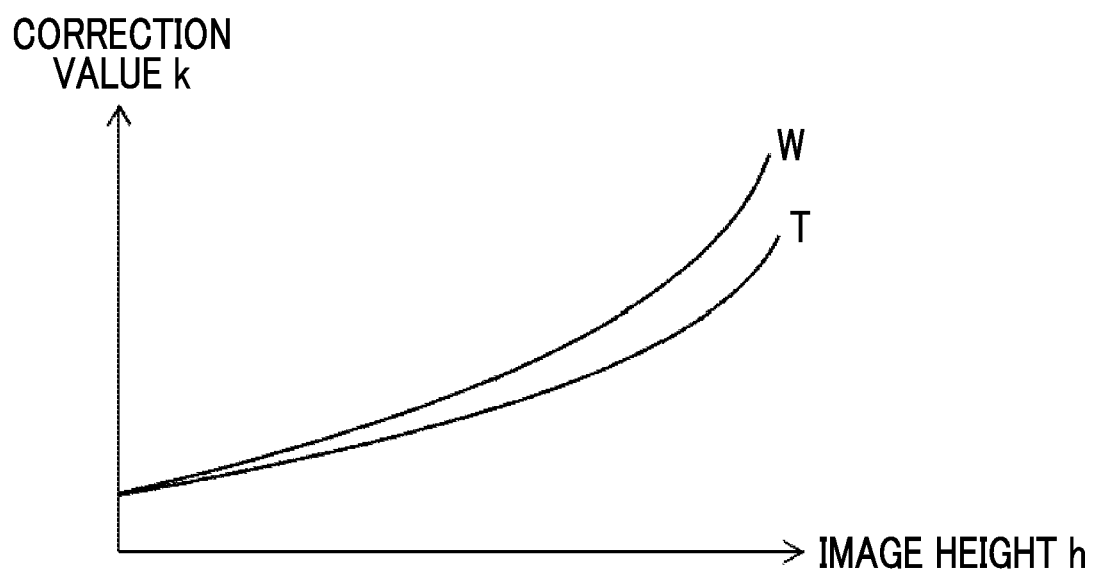
FIG. 12 is a graph showing a relationship between a zoom position, an image height, and a correction value.

FIG. 11 shows a main light beam path of a lens 14 in an outermost peripheral portion in a case where a zoom position is a wide-angle position W and a main light beam path of the lens 14 in an outermost peripheral portion in a case where a zoom position is a telephoto position T. FIG. 12 is a graph showing a relationship between an image height h and a correction value k in a case where a zoom position is the wide-angle position W, and a relationship between an image height h and a correction value k in a case where a zoom position is the telephoto position T. Correction information indicating the relationships between the zoom positions, the image heights h, and the correction values k is stored in the storage unit 22.

A correction unit 44 acquires correction information corresponding to a zoom position acquired by the zoom position acquisition unit 54 from the storage unit 22, and performs correction with respect to a distance image on the basis of the correction information.

Figure 13:
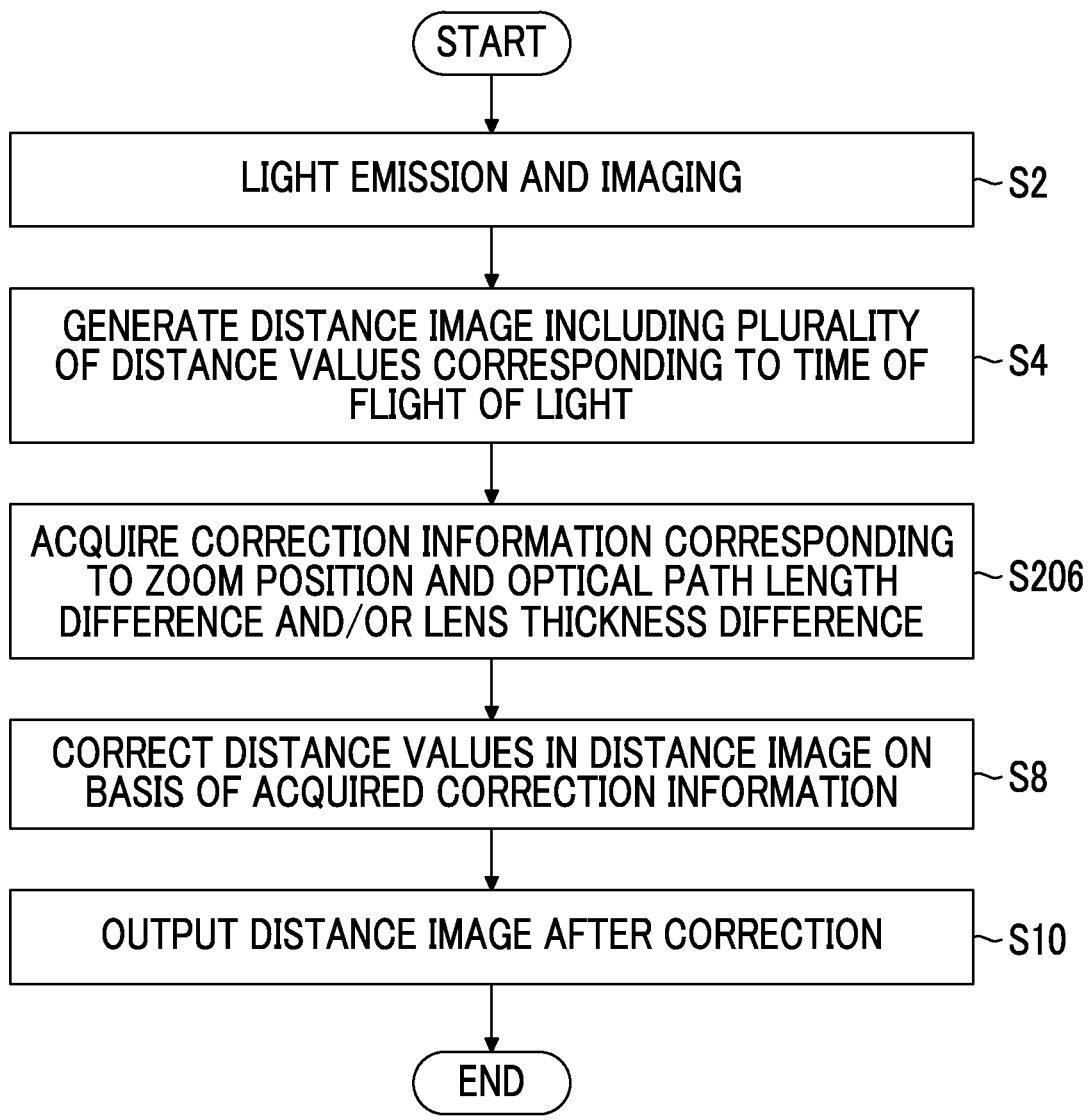
FIG. 13 is a flowchart showing a flow of a distance image processing example in the third embodiment.

FIG. 13 is a flowchart showing a flow of a distance image processing example in the third embodiment. The distance image processing of this example is executed in accordance with a program stored in the storage unit 22 by a controller 40. The same reference numerals are given to the same steps as in the distance image processing example in the first embodiment shown in FIG. 5, and detailed description thereof will not be repeated.

In this example, in step S206, the correction unit 44 acquires correction information corresponding to the zoom position.

Fourth Embodiment

Figure 14:
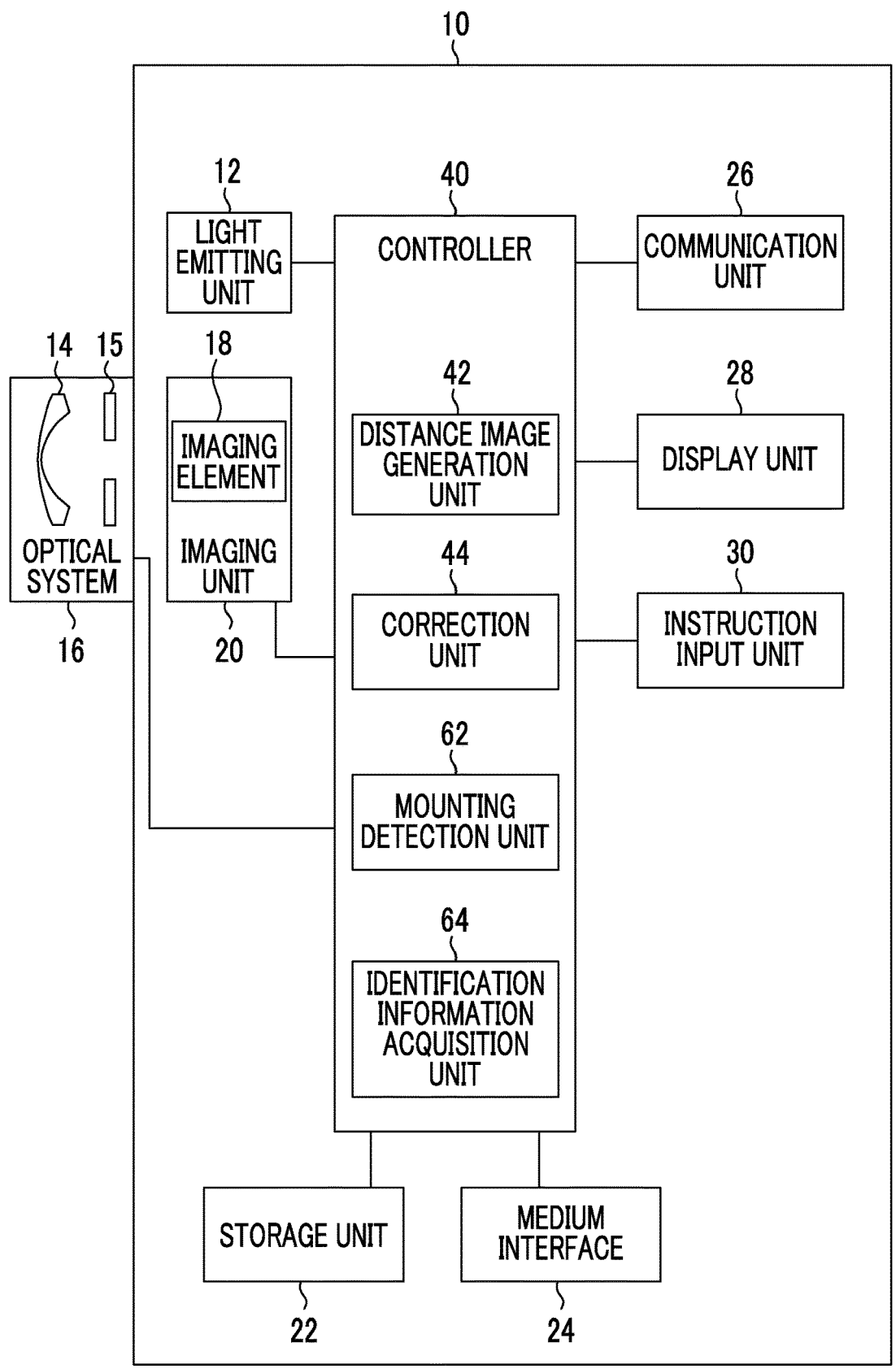
FIG. 14 is a block diagram showing a configuration example of a distance image acquisition apparatus according to a fourth embodiment.

FIG. 14 is a block diagram showing a configuration example of a distance image acquisition apparatus according to a fourth embodiment. The same reference numerals are given to the same components as in the first embodiment shown in FIG. 1, and detailed description thereof will not be repeated.

An optical system 16 of this embodiment is an exchange type optical system 16 which is able to be detachably mounted with respect to a main body including an imaging unit 20 of the distance image acquisition apparatus 10.

The distance image acquisition apparatus 10 according to this embodiment includes a mounting detection unit 62 that detects whether the optical system 16 is in a non-mounted state (referred to as a "detached state") or in a mounted state with respect to the main body of the apparatus, and an identification information acquisition unit 64 that acquires identification information of the lens 14 or identification information of the optical system 16.

The storage unit 22 stores correction information for each piece of identification information.

Further, the correction information of this example is divided into first correction information corresponding to an optical path length difference between main light beam paths for removing or reducing a first distance value error, and second correction information corresponding to a lens thickness difference between the main light beam paths for removing or reducing a second distance value error, and is then stored in the storage unit 22.

In a case where the mounted state of the optical system 16 is detected by the mounting detection unit 62, a correction unit 44 acquires correction information corresponding to identification information acquired by the identification information acquisition unit 64 from the storage unit 22, and corrects distance values in a distance image on the basis of the correction information corresponding to the identification information.

Figure 15:
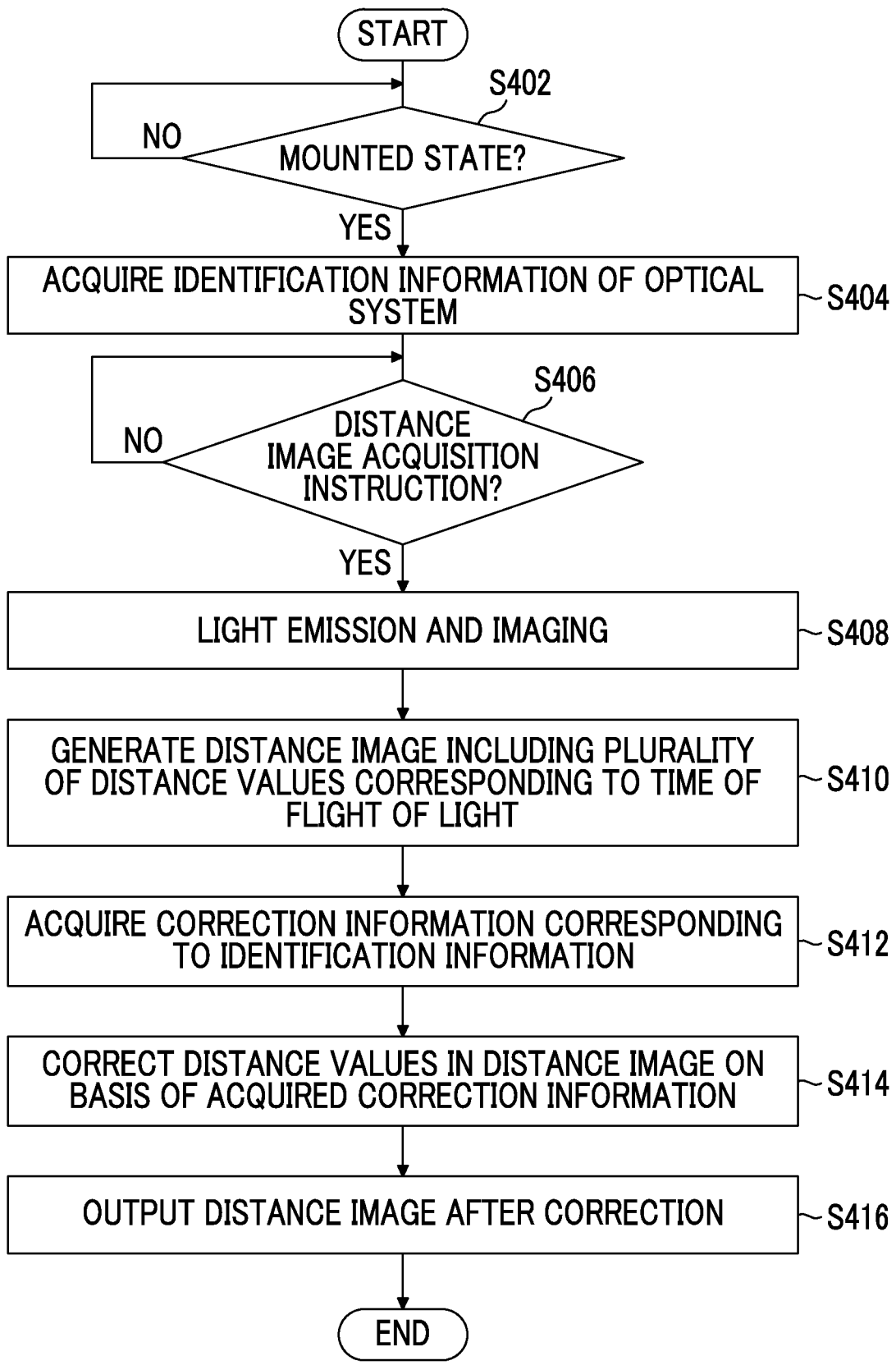
FIG. 15 is a flowchart showing a flow of a distance image processing example in the fourth embodiment.

FIG. 15 is a flowchart showing a flow of a distance image acquisition processing example in the distance image acquisition apparatus in FIG. 14. The distance image processing in this example is executed in accordance with a program stored in the storage unit 22 by a controller 40.

First, the mounting detection unit 62 detects whether the optical system 16 is in a state of being mounted with respect to the main body of the distance image acquisition apparatus 10 (mounted state) (step S402).

In a case where the optical system 16 is in the mounted state (in the case of YES in step S402), the identification information acquisition unit 64 acquires identification information of the optical system 16 (step S404). The identification information acquisition unit 64 may acquire identification information of the lens 14. For example, a method for acquiring identification information through communication with the optical system 16, a method for reading identification information from the optical system 16, or a method for inputting identification information through an instruction input unit 30 may be used. The identification information acquisition unit 64 may acquire identification information using any other methods.

Then, it is determined whether a distance image acquisition instruction is input through a communication unit 26 or the instruction input unit 30 (step S406), and in a case where the distance image acquisition instruction is input (in the case of YES in step S406), light emission of a light emitting unit 12 and imaging of the imaging unit 20 are performed (step S408). Then, a distance image is generated by the distance image generation unit 42 (step S410). Step S408 and step S410 are the same as the step S2 and step S4 in FIG. 5, and detailed description thereof will not be repeated.

Then, correction information corresponding to the identification information acquired in step S404 is acquired by the correction unit 44 from the storage unit 22 (step S412).

Then, the correction unit 44 corrects distance values in the distance image on the basis of the acquired correction information (step S414).

Then, the corrected distance image is output to a recording medium through a medium interface 24 (step S416). The corrected distance image may be output (transmitted) to an external device through the communication unit 26.

Fifth Embodiment

Figure 16:
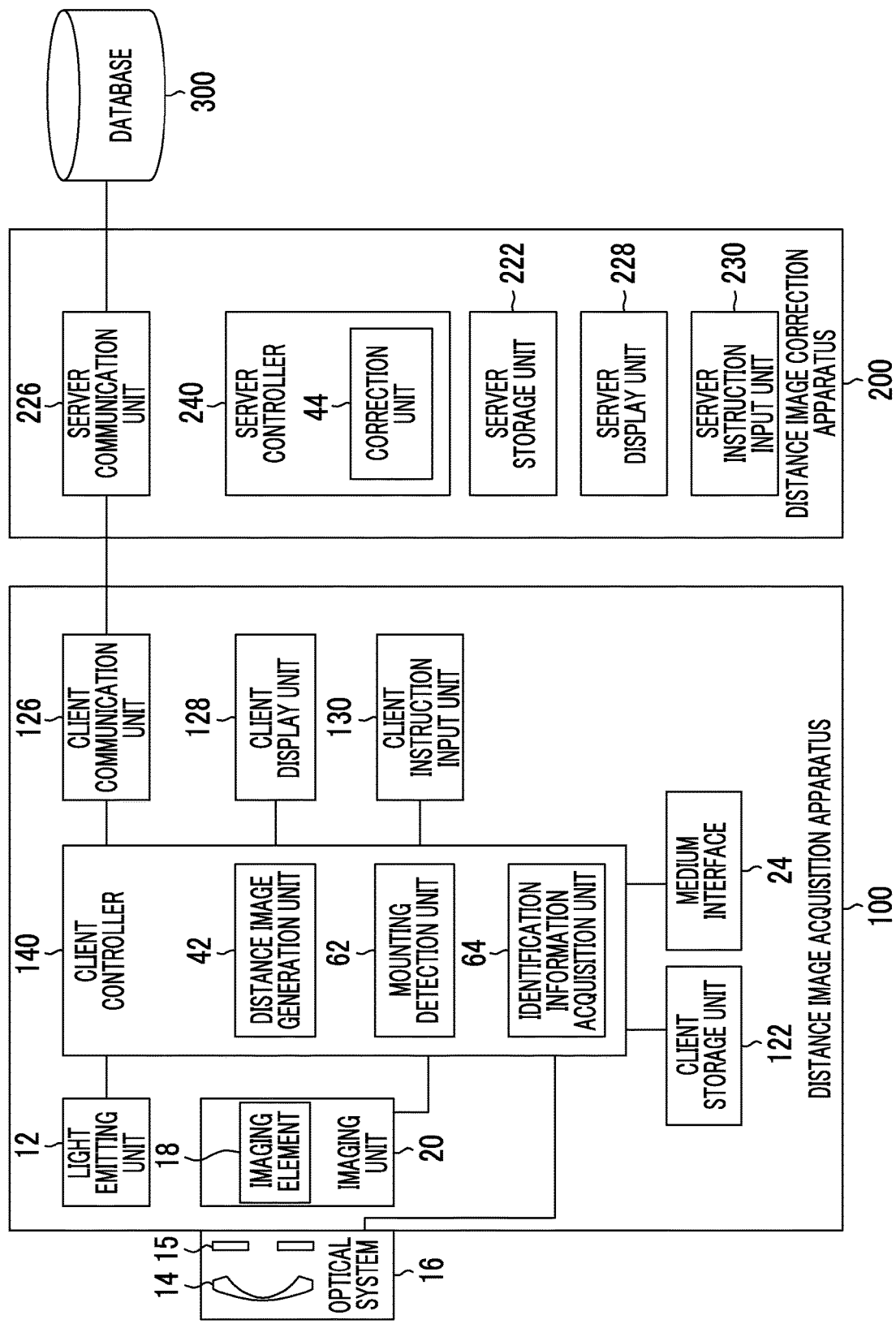
FIG. 16 is a block diagram showing a configuration example of a distance image processing system including a distance image acquisition apparatus and a distance image correction apparatus according to a fifth embodiment.

FIG. 16 is a block diagram showing a configuration example of a distance image processing system including a distance image acquisition apparatus and a distance image correction apparatus according to a fifth embodiment. The same reference numerals are given to the same components as in the distance image acquisition apparatus 10 in the fourth embodiment shown in FIG. 14, and detailed description thereof will not be repeated.

A distance image acquisition apparatus 100 according to this embodiment is a client apparatus, and transmits a distance image to a distance image correction apparatus 200. In this embodiment, the distance image is corrected by the distance image correction apparatus 200 that is a server apparatus.

The distance image acquisition apparatus 100 is configured to include a light emitting unit 12, an optical system 16, an imaging unit 20, a client storage unit 122 that stores a program for distance image processing in the distance image acquisition apparatus 100 and information necessary for execution of the program, a client communication unit 126 that communicates with the distance image correction apparatus 200, a client display unit 128 that performs display for a user of the distance image acquisition apparatus 100, a client instruction input unit 130 that receives an instruction input from the user of the distance image acquisition apparatus 100, and a client controller 140 that executes the distance image processing in the distance image acquisition apparatus 100 according to the program. The client controller 140 of this example is configured of a CPU, and is configured to include a distance image generation unit 42, a mounting detection unit 62, and an identification information acquisition unit 64. The client communication unit 126, the client display unit 128, and the client instruction input unit 130 are the same as the communication unit 26, the display unit 28, and the instruction input unit 30 in the fourth embodiment shown in FIG. 14, respectively.

The distance image correction apparatus 200 includes a server storage unit 222 that stores a program for distance image processing in the distance image correction apparatus 200 and information necessary for execution of the program, a server communication unit 226 that communicates with the distance image acquisition apparatus 100 and a database 300, a server display unit 228 that performs display for a manager, a server instruction input unit 230 that receives an instruction input from the manager, and a server controller 240 that executes the distance image processing in the distance image correction apparatus 200 in accordance with the program. The server controller 240 is configured of a CPU, and includes a correction unit 44. The server communication unit 226 functions as an "input unit", an "identification information acquisition unit", and an "output unit" in the invention. The server storage unit 222 is configured of a storage device. The server communication unit 226 is configured of a wireless communication device and/or a wired communication device. The server display unit 228 is configured of a display device. The server instruction input unit 230 is configured of an input device that receives an instruction from a user.

The database 300 stores correction information for each piece of identification information. The database 300 functions as a "correction information storage unit" in the invention.

Figure 17:
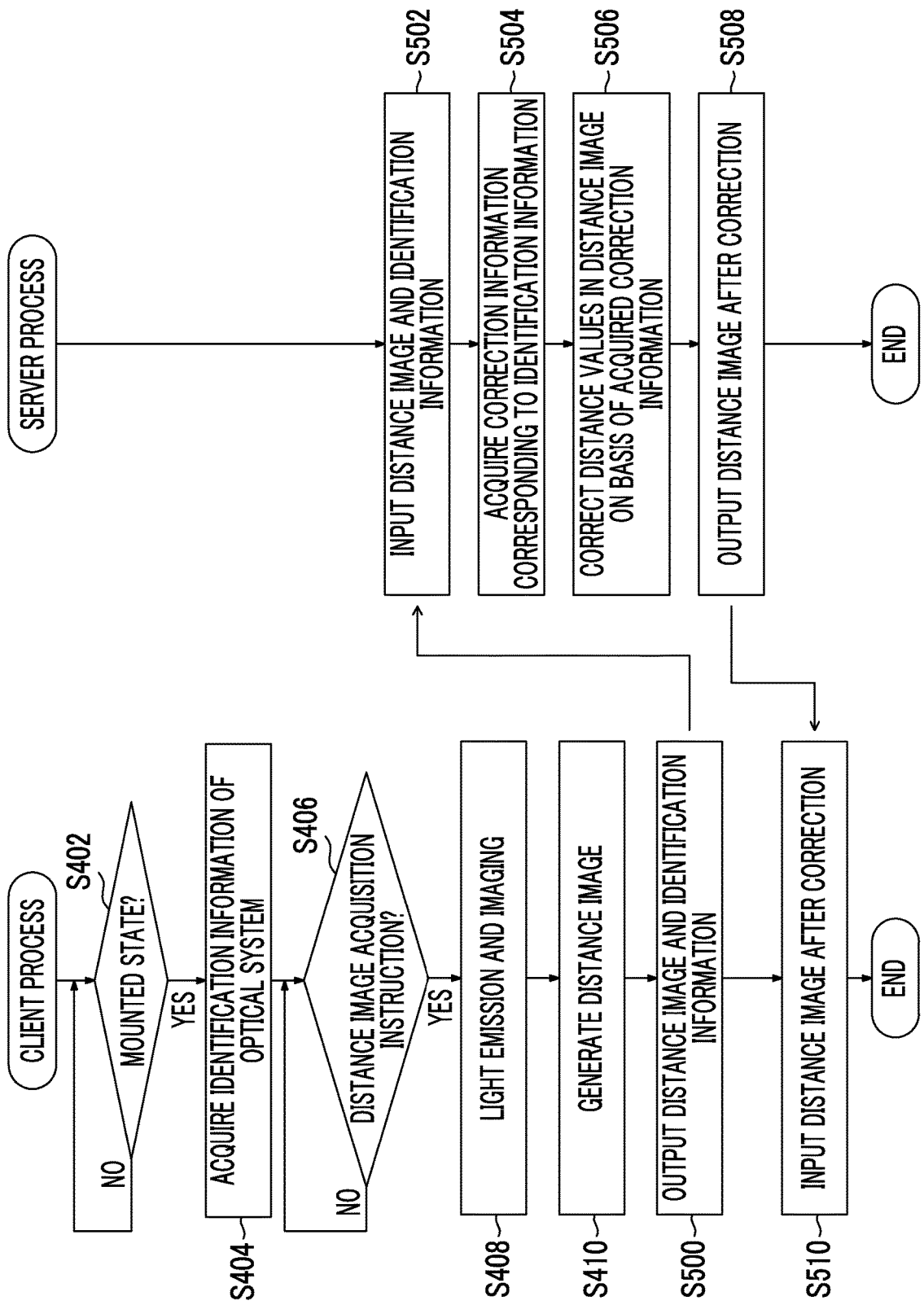
FIG. 17 is a flowchart showing a flow of a distance image processing example in the fifth embodiment.

FIG. 17 is a flowchart showing a flow of a distance image processing example in the fifth embodiment. A "client process" on the left side in the figure refers to distance image processing in the distance image acquisition apparatus 100, and a "server process" on the right side in the figure refers to distance image processing in the distance image correction apparatus 200. Further, steps S402 to S410 are the same as the steps having the same reference numerals in the fourth embodiment shown in FIG. 15, and description thereof will not be repeated.

The distance image acquisition apparatus 100 outputs a distance image generated by the distance image generation unit 42 and identification information acquired by the identification information acquisition unit 64 to the distance image correction apparatus 200 through the client communication unit 126 (step S500). That is, a distance image before correction and identification information of the optical system 16 (or identification information of the lens 14) are transmitted to the distance image correction apparatus 200 from the distance image acquisition apparatus 100. Identification information of the distance image acquisition apparatus 100 may be transmitted together with the distance image. The distance image correction apparatus 200 receives the inputs of the distance image and the identification information through the server communication unit 226 (step S502). That is, the distance image and the identification information are received by the distance image correction apparatus 200.

Then, the distance image correction apparatus 200 acquires correction information corresponding to the identification information input from the distance image acquisition apparatus 100 from the database 300 through the server communication unit 226 (step S504).

Then, the distance image correction apparatus 200 corrects distance values in the distance image on the basis of the correction information acquired from the database 300 using the correction unit 44 of the server controller 240 (step S506).

Then, the distance image correction apparatus 200 outputs the corrected distance image to the distance image acquisition apparatus 100 through the server communication unit 226 (step S508). That is, the distance image after correction is transmitted to the distance image acquisition apparatus 100 from the distance image correction apparatus 200. The distance image acquisition apparatus 100 receives the input of the corrected distance image through the client communication unit 126 (step S510). That is, the distance image after correction is received by the distance image acquisition apparatus 100. The distance image acquisition apparatus 100 stores the distance image after correction. For example, the distance image after correction is stored in the client storage unit 122. The distance image after correction may be stored in a recording medium through the medium interface 24.

[Correction Information Generation Method]

An example of a correction information generation method will be described.

Figure 18:
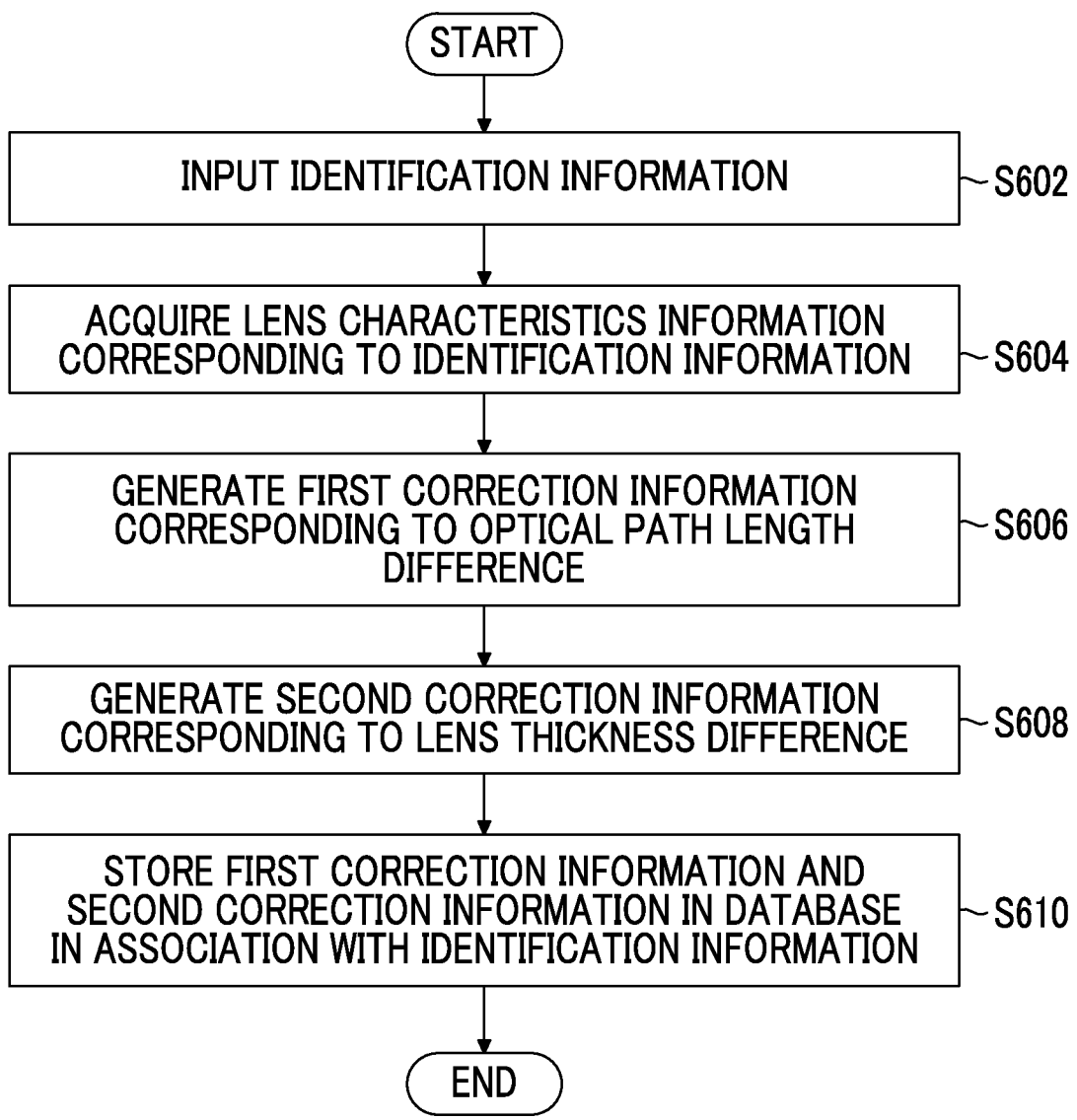
FIG. 18 is a flowchart showing a flow of a process example of a correction information generation method.

FIG. 18 is a flowchart showing a flow of a process example of a correction information generation method. In this example, as correction information for correcting distance values in a distance image, first correction information corresponding to an optical path length difference between main light beam paths and second correction information corresponding to a lens thickness difference between the main light beam paths are generated. This process is executed in accordance with a program using the server controller 240 of the distance image correction apparatus 200 in FIG. 16, for example.

First, an input of one piece of identification information among identification information of the lens 14 of the optical system 16, identification information of the optical system 16, and identification information of the distance image acquisition apparatus 100 is received through the server instruction input unit 230 (step S602).

Then, lens characteristic information corresponding to the input identification information is acquired from the database 300 through the server communication unit 226 (step S604). The lens characteristic information includes information on an optical path length difference between a plurality of main light beam paths, information on a lens thickness difference between the plurality of main light beam paths, and information on a light speed in a lens (for example, refractive index information of the lens 14) or information on a material of the lens, relating to the optical system 16 of the distance image acquisition apparatus 100.

Then, the first correction information is generated on the basis of the acquired lens characteristic information by the server controller 240 (step S606).

Then, the second correction information is generated on the basis of the acquired lens characteristic information by the server controller 240 (step S608).

Then, the generated correction information (the first correction information and the second correction information) are stored in the database 300 in association with the identification information, through the server communication unit 226 (step S610).

Figure 19:
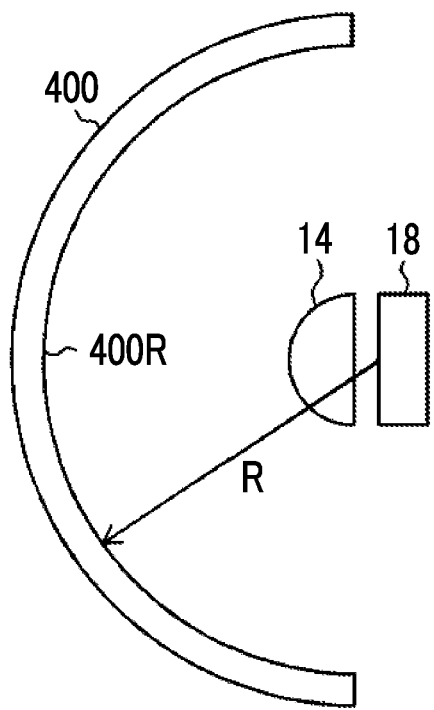
FIG. 19 is an explanatory diagram illustrating an example of an aspect in which correction information is generated through measurement.

In the above-described example, correction information is generated on the basis of lens design values, but correction information may be generated through measurement. For example, as shown in FIG. 19, a reflecting object 400 having a reflecting surface 400R that forms an equal distance R from an imaging center of the imaging element 18 of the distance image acquisition apparatus (for example, 100 in FIG. 16) is prepared as a subject that is a distance measurement target, distance values (distance measurement results) of a distance image generated by the distance image generation unit 42 is compared with an actual distance (a distance R from the imaging center of the imaging element 18 to the reflecting surface 400R), and correction information is generated from a difference therebetween. In this example, the main light beam paths are approximated by a straight line that radially extends from the imaging center of the imaging element 18 to measure a distance error.

The correction information may be generated as two-dimensional table information represented by a two-dimensional coordinates system (XY coordinates system) of the distance image, or may be generated as one-dimensional table information associated with an image height.

[Variation of Correction Information]

In the above-described first to fifth embodiments, a case where correction is performed using correction information corresponding to both of a first distance value error due to an optical path length difference and a second distance value error due to a lens thickness difference has been described as an example. Here, there is a case where an operational error in generation of the correction information and an operational error in correction enter a distance image after correction, and there is a case where one of the first distance value error or the second distance value error is in an allowable range. Thus, a configuration in which any one of the first distance value error and the second distance value error is ignored may be used.

Accordingly, a configuration in which whether or not to perform correction using the first correction information corresponding to the optical path length difference by the correction unit 44 and whether or not to perform correction using the second correction information corresponding to the lens thickness difference by the correction unit 44 are determined on the basis of identification information of the lens 14, the optical system 16 or the distance image acquisition apparatus 10 or 100 may be used. Further, a configuration in which only any one of the first correction information and the second correction information is stored in the correction information storage unit (the storage unit 22 or the database 300) may be used.

Further, a case where correction information associated with lens thicknesses in optical path directions of main light beams is used as "lens thicknesses", as shown in FIG. 2, has been described, but a case where correction information associated with lens thicknesses of the lens 14 in optical axis directions is used is also included in the invention. This is because in a lens structure in which a lens thickness varies from a central portion of the lens 14 toward a peripheral portion thereof, even in a case where correction information is associated with the lens thicknesses of the lens 14 in the optical axis directions, the correction information is indirectly associated with the lens thicknesses in the main light beam directions.

[Variations of Distance Measurement Method]

The invention may be applied to a distance measurement method (hereinafter, referred to as a "TOF method") for calculating a plurality of distance values corresponding to a time of flight (TOF) of light after being emitted and then reflected in a distance measurement region until being received in an imaging element.

As an example of such a TOF method, a method for irradiating a distance measurement region with pulse light to acquire a distance image on the basis of the amount of received light for each pixel of an imaging element (hereinafter, referred to as a "pulse detection method") may be used. In addition, a method for irradiating a distance measurement region with light that is modulated at high frequency and detecting a phase shift to acquire a distance image (hereafter, referred to as a "phase difference detection method") is used, but since it is not easy to directly detect a phase difference between light emission and light reception in a case where a distance measurement range is a short range, it is difficult to apply the method to the invention. Here, any TOF method may be employed according to distance measurement environments, and the invention may be applied to any TOF method.

The above-described first to fifth embodiments may be appropriately combined for realization. For example, correction may be performed using correction information corresponding to combinations of F numbers and zoom positions by combining the second and third embodiments. Further, the second embodiment and the third embodiment may be combined with the fourth embodiment (in a case where an optical system is an exchange type) and the fifth embodiment (in the case of a server/client system).

Hereinbefore, the embodiments for realizing the invention have been described, but the invention is not limited to the above-described embodiments and modification examples, and various modifications may be employed in a range without departing from the concept of the invention.

EXPLANATION OF REFERENCES

10: distance image acquisition apparatus
12: light emitting unit
14: lens
14Z: zoom lens
15: stop
16: optical system
18: imaging element
20: imaging unit
22: storage unit
24: medium interface
26: communication unit
28: display unit
30: instruction input unit
40: controller
42: distance image generation unit
44: correction unit
52: F number acquisition unit
54: zoom position acquisition unit
62: mounting detection unit
64: identification information acquisition unit
100: distance image acquisition apparatus
122: client storage unit
126: client communication unit
128: client display unit
130: client instruction input unit
140: client controller
200: distance image correction apparatus
222: server storage unit
226: server communication unit
228: server display unit
230: server instruction input unit
240: server controller
300: database
400: reflecting object
400R: reflecting surface
C: imaging center
DI: distance image
D0 to D4: lens thickness
P0 to P4: main light beam path
Sa: light-receiving surface
T: telephoto position W: wide-angle position
h: image height
k: correction value

What is claimed is:

1. A distance image acquisition apparatus comprising:
a light emitting unit that emits light;
an imaging unit that has a light-receiving surface on which a plurality of light-receiving elements are arranged;
an optical system that includes a lens that guides the light emitted from the light emitting unit and reflected in a distance measurement region to the light-receiving surface of the imaging unit;
a distance image generation unit that generates a distance image including a plurality of distance values corresponding to a time of flight of the light from the light emitting unit to the light-receiving surface of the imaging unit on the basis of an imaging result of the imaging unit;
a correction information storage unit that stores correction information corresponding to an error of the distance value due to differences among lens thicknesses on the plurality of main light beam paths from the lens to the light-receiving surface of the imaging unit; and
a correction unit that corrects the distance values in the distance image on the basis of the correction information.

2. The distance image acquisition apparatus according to claim 1,
wherein the correction information corresponds to an optical path length difference and the lens thickness difference between the plurality of main light beam paths, and
the correction unit performs correction relating to the optical path length difference and the lens thickness difference with respect to the distance image.

3. The distance image acquisition apparatus according to claim 2,
wherein the correction information includes first correction information corresponding to the optical path length difference and second correction information corresponding to the lens thickness difference.

4. The distance image acquisition apparatus according to claim 1,
wherein the lens has a structure in which a lens thickness concentrically increases from a central portion of the lens to a peripheral portion thereof,
the distance image is configured to include a plurality of pixels respectively having the plurality of distance values,
the correction information storage unit stores the correction information in association with an image height, and
the correction unit performs correction with respect to each distance value in the distance image on the basis of coordinates of each pixel of the distance image and the correction information associated with the image height.

5. The distance image acquisition apparatus according to claim 1,
wherein the optical system includes a stop,
the distance image acquisition apparatus further comprises an F number acquisition unit that acquires an F number of the stop of the optical system,
the correction information storage unit stores the correction information for each F number of the stop, and
the correction unit acquires the correction information corresponding to the acquired F number from the correction information storage unit and performs correction with respect to the distance image on the basis of the correction information.

6. The distance image acquisition apparatus according to claim 1,
wherein the optical system includes a zoom lens,
the distance image acquisition apparatus further comprises a zoom position acquisition unit that acquires a zoom position of the zoom lens of the optical system,
the correction information storage unit stores the correction information for each zoom position of the zoom lens, and
the correction unit acquires the correction information corresponding to the acquired zoom position from the correction information storage unit and performs correction with respect to the distance image on the basis of the correction information.

7. The distance image acquisition apparatus according to claim 1,
wherein the optical system is an exchange type optical system that is able to be detachably mounted with respect to an apparatus main body including the imaging unit,
the distance image acquisition apparatus further comprises an identification information acquisition unit that acquires identification information of the lens or identification information of the optical system,
the correction information storage unit stores the correction information for each piece of identification information, and
the correction unit acquires the correction information corresponding to the acquired identification information and performs correction with respect to the distance image on the basis of the correction information.

8. The distance image acquisition apparatus according to claim 1,
wherein the lens includes a wide-angle lens or a fisheye lens.

9. The distance image acquisition apparatus according to claim 8,
wherein the lens has an angle of view of 140° or greater.

10. A distance image correction apparatus comprising:
an input unit through which a distance image including a plurality of distance values is input;
a correction information storage unit that stores, in a case where the distance image is acquired using a distance image acquisition apparatus that includes a light emitting unit, a lens, and an imaging unit, correction information including a plurality of correction values corresponding to an error of the distance value due to a lens thickness difference between a plurality of main light beam paths from the lens to a light-receiving surface of the imaging unit; and
a correction unit that performs correction with respect to the distance values in the distance image on the basis of the correction information.

11. The distance image correction apparatus according to claim 10,
wherein the correction information corresponds to an optical path length difference and the lens thickness difference between the plurality of main light beam paths, and
the correction unit performs correction relating to the optical path length difference and the lens thickness difference with respect to the distance image.

12. The distance image correction apparatus according to claim 10, further comprising:
an output unit that outputs the corrected distance image to the distance image acquisition apparatus.

13. The distance image correction apparatus according to claim 10, further comprising:
an identification information acquisition unit that acquires at least one of identification information of the lens, identification information of an optical system including the lens, or identification information of the distance image acquisition apparatus;
wherein the correction information storage unit stores the correction information in association with the plurality of pieces of identification information; and
the correction unit performs correction of the distance image on the basis of the correction information associated with the identification information acquired by the identification information acquisition unit.

14. A distance image acquisition method comprising, in a state where correction information including a plurality of correction values corresponding to an error of distance value due to a lens thickness difference between a plurality of main light beam paths from a lens to a light-receiving surface of an imaging unit is stored in a correction information storage unit:
a step of performing imaging using the imaging unit in a state where light emitted from a light emitting unit and reflected in a distance measurement region is guided to the light-receiving surface of the imaging unit by an optical system including the lens;
a step of generating a distance image including a plurality of distance values corresponding to a time of flight of the light from the light emitting unit to the light-receiving surface of the imaging unit on the basis of an imaging result of the imaging unit; and
a step of correcting the distance values in the distance image on the basis of the correction information.

15. The distance image acquisition method according to claim 14,
wherein the correction information corresponds to a lens thickness difference between the plurality of main light beam paths and an optical path length difference between the plurality of main light beam paths, and
correction relating to the lens thickness difference and the optical path length difference is performed with respect to the distance values in the distance image.

16. A correction information generation method comprising:
a step of acquiring, in a case where a distance image including a plurality of distance values is acquired using a distance image acquisition apparatus that includes a light emitting unit, a lens, and an imaging unit, lens characteristic information including information on a lens thickness difference between a plurality of main light beam paths from the lens to a light-receiving surface of the imaging unit and information on a light speed in the lens or information on a material of the lens; and
a step of generating correction information with respect to an error of the distance value due to differences among lens thicknesses on the plurality of main light beam paths from the lens to the light-receiving surface of the imaging unit on the basis of the lens characteristic information.

17. The correction information generation method according to claim 16,
wherein the lens characteristic information includes information on an optical path length difference between the plurality of main light beam paths.

* * * * *